ELECTROMAGNETICALLY RELEASABLE CONTACTOR LATCH
Filed March 19, 1963
6 Sheets-Sheet 1
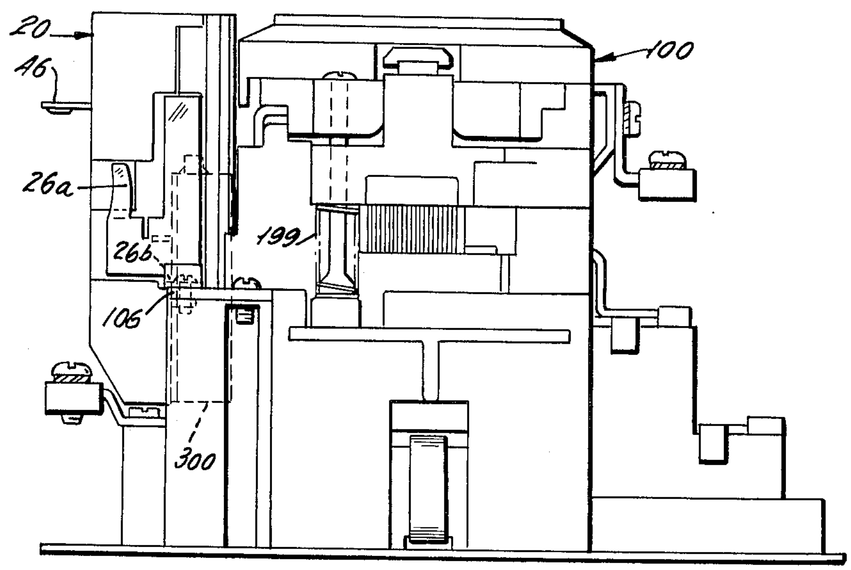
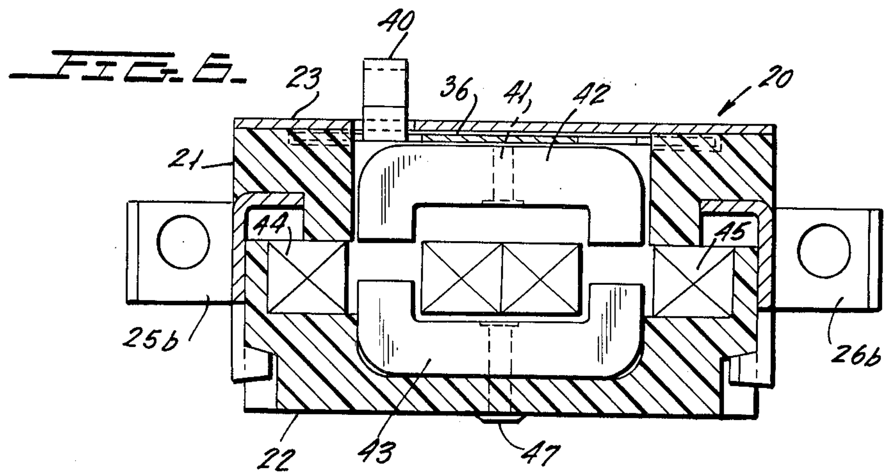
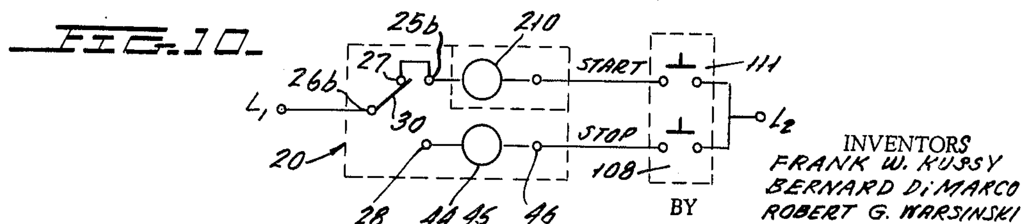
INVENTORS
FRANK W. KUSSY
BERNARD DiMARCO
ROBERT G. WARSINSKI
ELWOOD T. PLATZ
BY
OSTROLENK, FABER, GERB & SOFFEN
ATTORNEYS ELECTROMAGNETICALLY RELEASABLE CONTACTOR LATCH
Filed March 19, 1963 
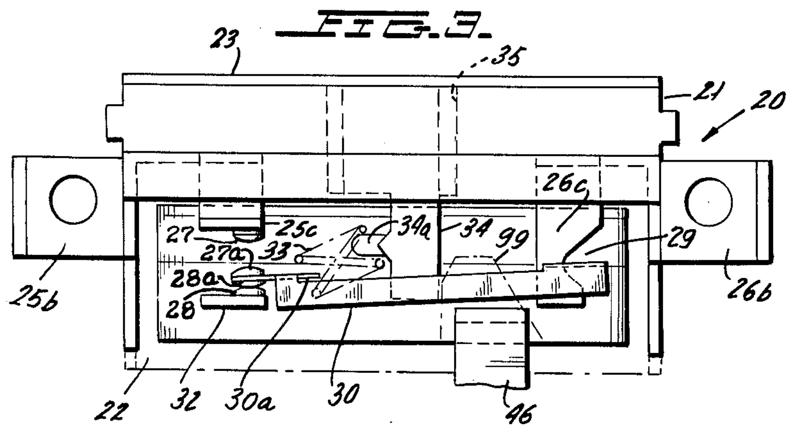
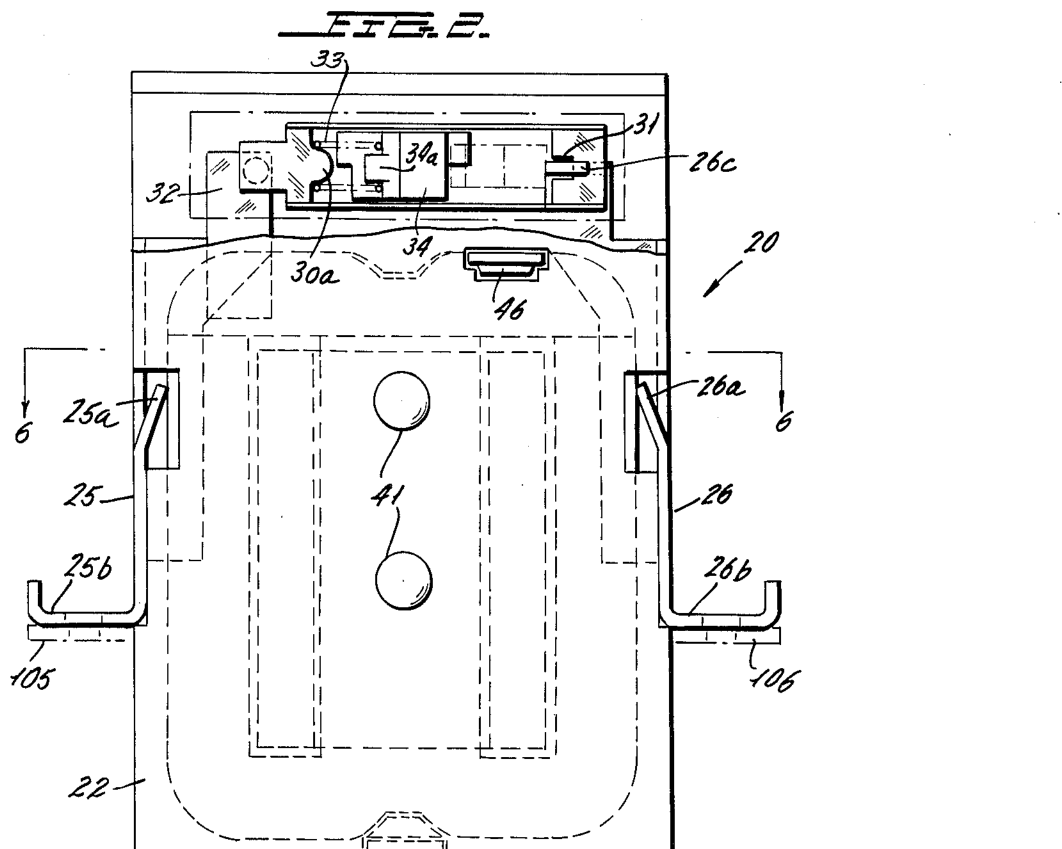
INVENTORS
FRANK W. KUSSY
BERNARD DiMARCO
BY ROBERT G. WARSINSKI
ELWOOD T. PLATZ
OSTROLENK, FABER, GERB & SOFFEN
ATTORNEYS ELECTROMAGNETICALLY RELEASABLE CONTACTOR LATCH
Filed March 19, 1963
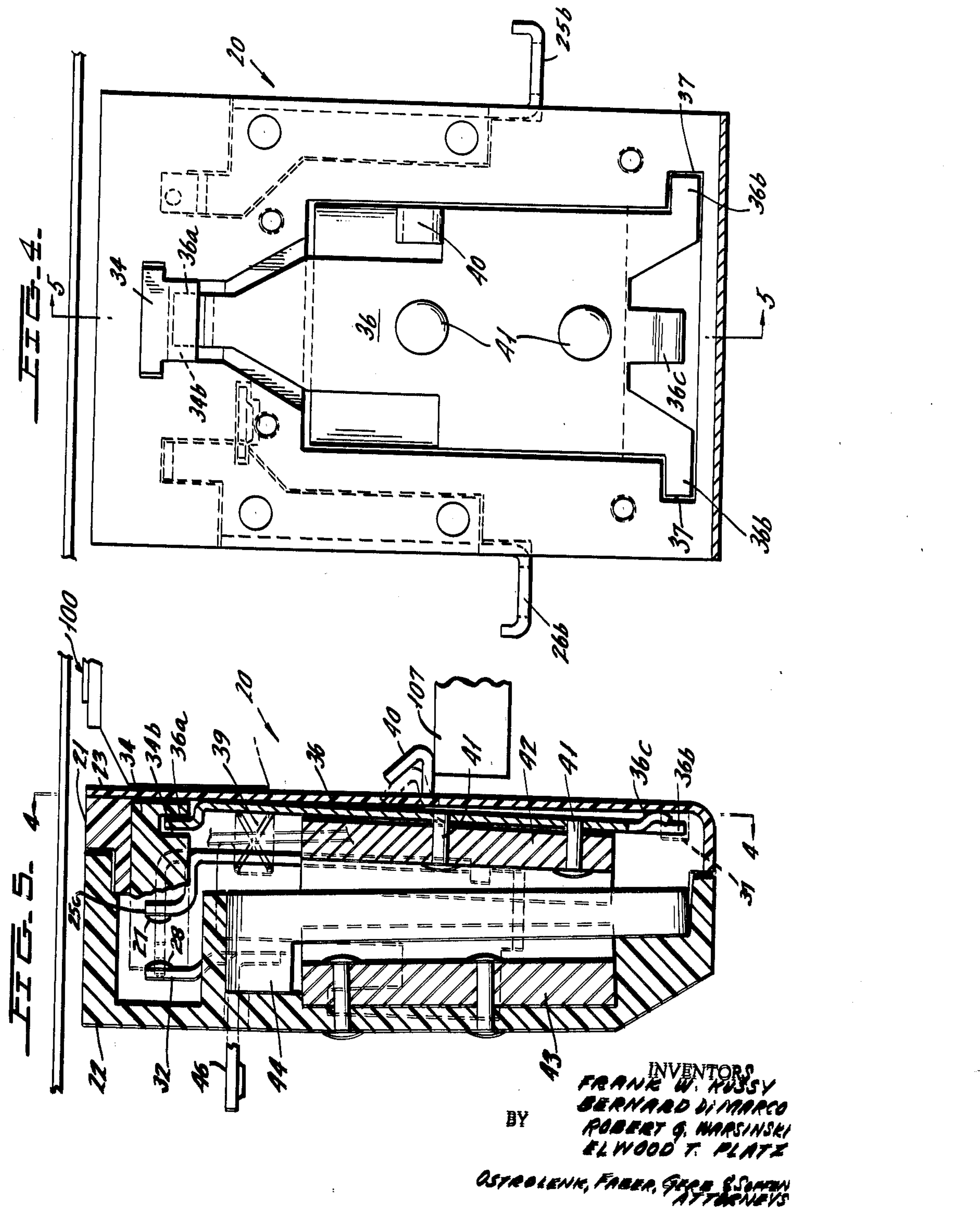

Figure 7:
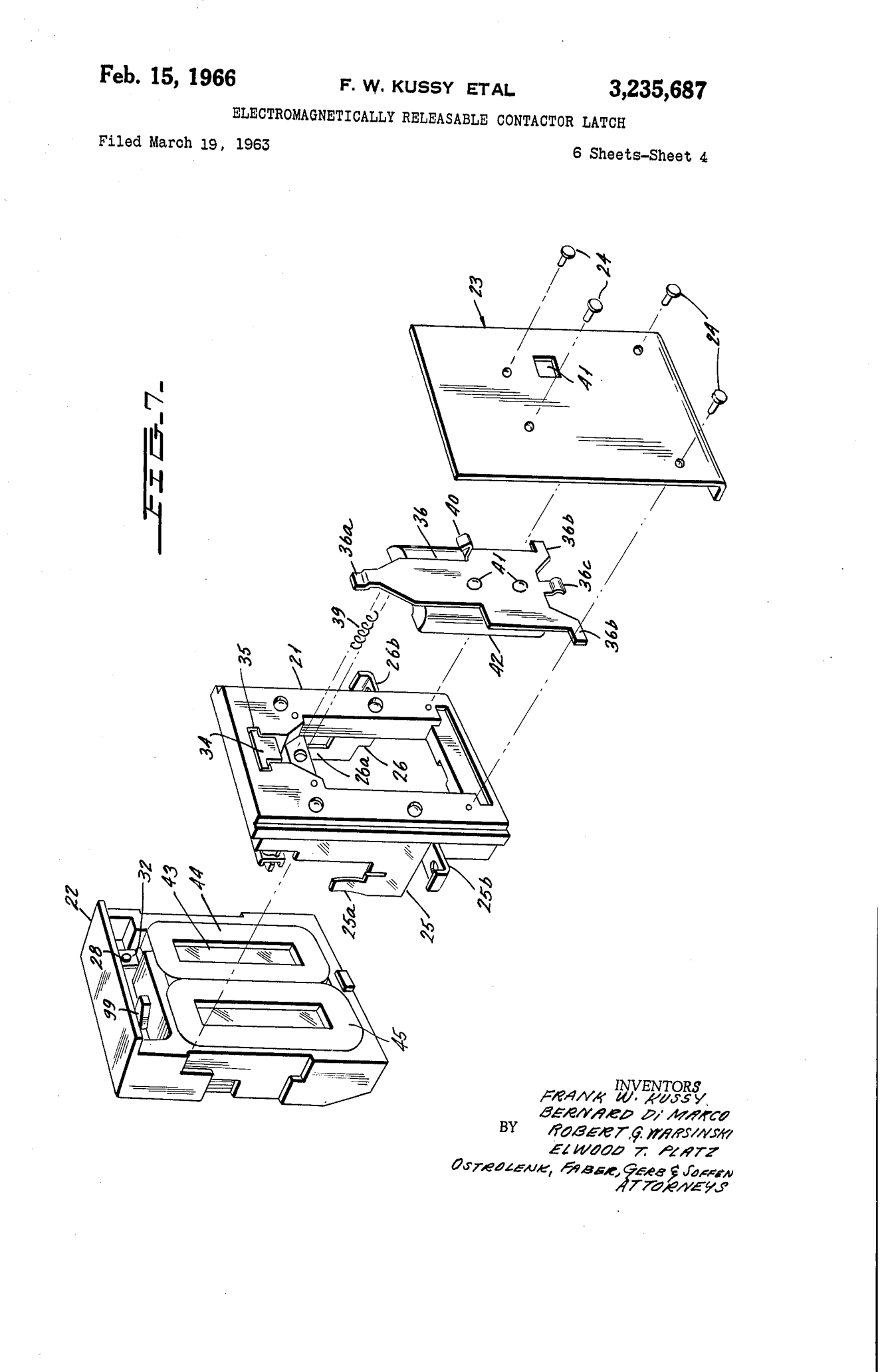

ELECTROMAGNETICALLY RELEASABLE CONTACTOR LATCH

Filed March 19, 1963

INVENTORS
FRANK W. KUSSY
BERNARD Di MARCO
ROBERT G. WARSINSKI
ELWOOD T. PLATZ
BY
OSTROLENK, FABER, GERB & SOFFEN
ATTORNEYS

ELECTROMAGNETICALLY RELEASABLE CONTACTOR LATCH

Filed March 19, 1963 6 Sheets-Sheet 5

INVENTORS
FRANK W. KUSSY
BERNARD Di MARCO
ROBERT G. WARSINSKI
ELWOOD T. PLATZ
BY
OSTROLENK, FABER, GERB & SOFFEN
ATTORNEYS

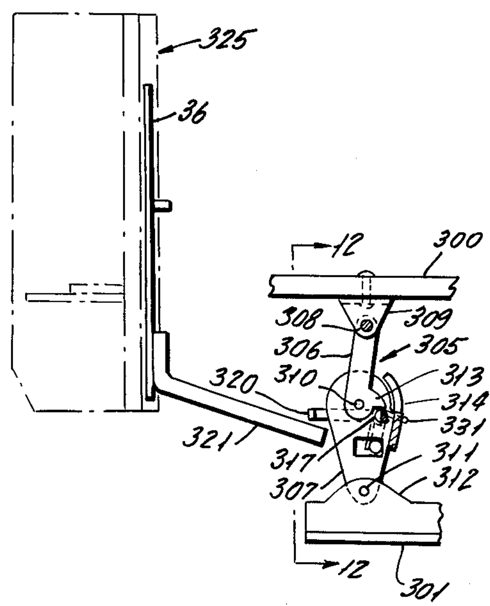
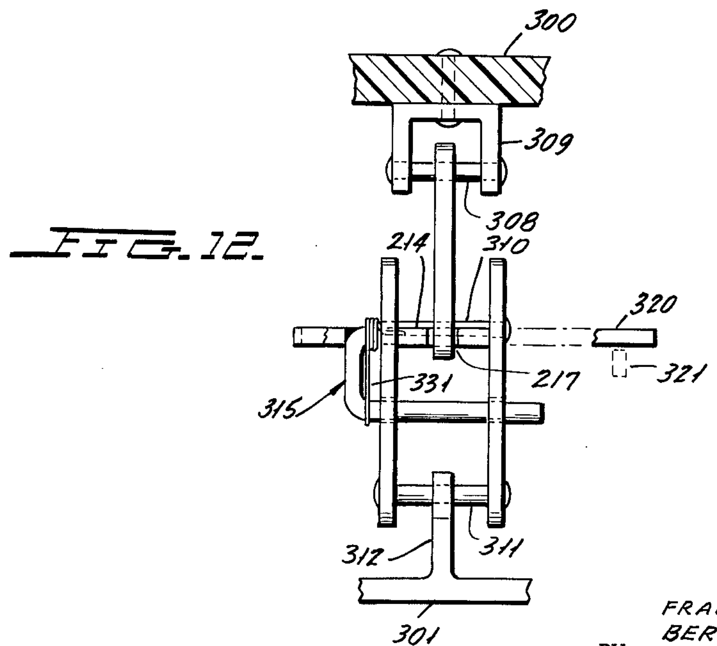
INVENTORS
FRANK W. KUSSY
BERNARD Di MARCO
ROBERT G. WARSINSKI
ELWOOD T. PLATZ
BY
OSTROLENK, FABER, GERB & SOFFEN
ATTORNEYS United States Patent Office 3,235,687
Patented Feb. 15, 1966

1 2

3,235,687
ELECTROMAGNETICALLY RELEASABLE CONTACTOR LATCH

Frank W. Kussy, Birmingham, Bernard Di Marco, Lincoln Park, Robert G. Warsinski, Royal Oak, and Elwood T. Platz, Grosse Pointe Farms, Mich., assignors to I-T-E Circuit Breaker Company, Philadelphia, Pa., a corporation of Pennsylvania Filed Mar. 19, 1963, Ser. No. 266,252
13 Claims. (Cl. 200—106)

The instant invention relates to latches in general and more particularly to a novel construction for a mechanical latch utilized with contactors.

Traditionally contactors have been latched either electrically or mechanically and on some occasions they have been latched both electrically and mechanically. In an electrically latched arrangement fluctuations in line voltage may permit dropout so that circuits not provided with automatic resetting means would be interrupted for an extended period of time. In lighting circuits, this would not be permissible and in other types of circuits while no actual harm would be done, interruption of service would prove to be very annoying. Some electrical latch arrangements have this disadvantage in that the latch is maintained in latching position through the energization of an electromagnet so that upon a temporary reduction of voltage the latch may drop out.

Accordingly, it is a primary object of this invention to provide a novel construction for a mechanical contactor latch. In carrying out this object, the latch of the instant invention is constructed so as to be biased to latching position and is momentarily operated to unlatching position to permit opening of the contactor.

Briefly, the latching unit comprises an operating coil for moving the mechanical latch to unlatching position and a single pole double throw switch whose position is a function of the latch position. With the contactor in open position the contact carrier thereof is positioned to maintain the latch in its open position and under these circumstances the latch unit switch is positioned so that there is a closed switch section in series with the contactor operating coil and the normally open start control.

Closing the start control energizes the contactor operating coil thereby closing the contactor contacts and operating the contact carrier to a position wherein it no longer maintains the latch in open position. The latch unit biasing means is then free to operate the latch to latching position. Upon this occurrence the latch unit switch is operated so that the portion thereof in series with the contactor coil is now open and a portion thereof in series with the mechanical latch unit operating coil is now closed.

This last portion of the switch and the mechanical latch unit coil are in series with a normally open stop control. Operation of the stop control energizes the coil of the mechanical latch unit thereby operating the mechanical latch to open position and permitting the biasing springs of the contactor to operate the latter to open circuit position.

It is noted that the arrangement outlined above is such that the electromagnet of the mechanical latch is operated only momentarily even when the "stop" control button is actuated for an extended period of time. Because of this, the electromagnetic construction provided is a very compact structure. That is, the magnet and armature are each a simple one piece unit rather than being constructed of stacked laminations. A laminated construction is required in prior art arrangements where the coil is energized from an A.C. source and is energized for long periods of time. Further, since the mechanical latch unit of the instant invention is not required to be energized more than momentarily there is no need to provide means for suppressing A.C. hum.

In most prior art mechanical latch constructions for contactors the electrical and mechanical portions thereof each require separate connections to the contactor proper with these connections being such that field conversion from electrical to mechanical latching could not readily be accomplished.

Accordingly, another primary object of this invention is to provide a mechanical latch unit in which the electrical and mechanical elements are integrated and carried within a single housing.

Still another object is to provide a latch unit of this type which may readily be installed in the field in place of an electrical holding interlock.

A further object is to provide a latch unit of this type in which the electromagnet is of simplified construction.

A still further object is to provide an interlock unit of this type which is of compact construction.

These as well as other objects of this invention shall become readily apparent after reading the following description of the accompanying drawings in which:

FIGURE 1 is a side elevation showing a mechanical interlock constructed in accordance with the teachings of the instant invention mounted for cooperation with a contactor.

FIGURE 2 is a front elevation of the latch unit with a portion of the housing broken away to reveal certain of the internal elements.

FIGURE 3 is a plan view of the latch unit with the top of the housing removed to reveal certain of the internal elements.

FIGURE 4 is a rear elevation of the interlock unit with the back cover removed looking in the direction of arrows 4—4 of FIGURE 5.

FIGURE 5 is a cross-section taken through line 5—5 of FIGURE 4 looking in the direction of arrows 5—5.

FIGURE 6 is a cross-section taken through line 6—6 of FIGURE 2 looking in the direction of arrows 6—6.

FIGURE 7 is an exploded perspective showing main assemblies of the latch.

FIGURE 10 is a schematic showing the electrical coordination between the latch unit and a contactor.

FIGURE 11 is a partial side elevation showing a modification of the latch for operation with contactors of large size.

FIGURE 12 is a fragmentary elevation view of the elements in FIGURE 11 looking in the direction of arrows 12—12 of FIGURE 11.

Figure 8:
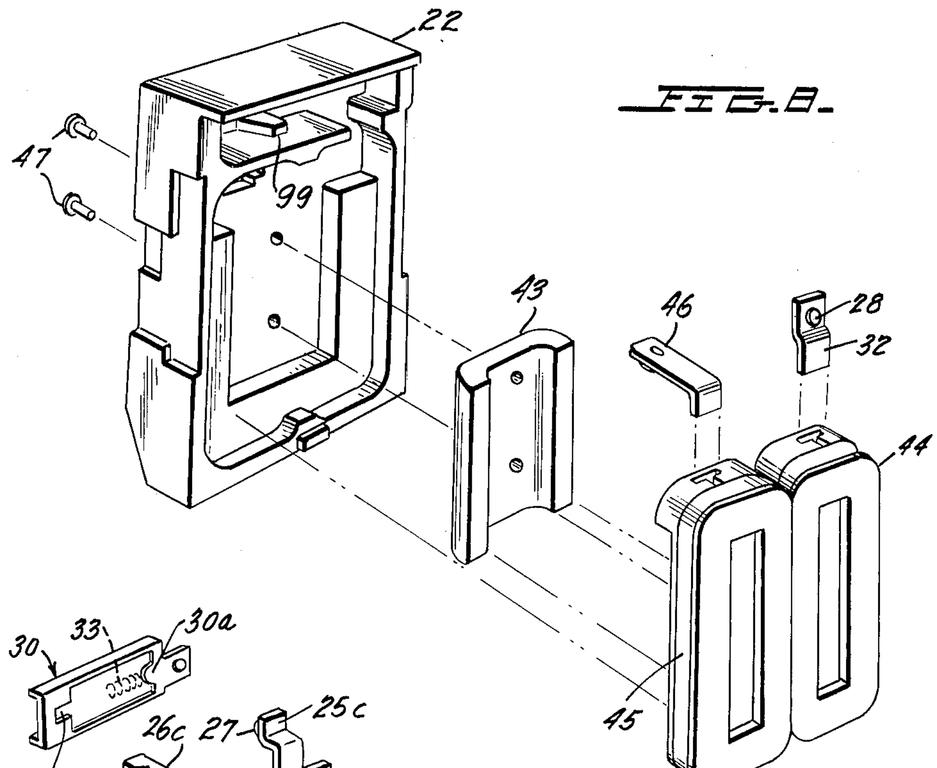
FIGURE 8 is an exploded perspective of the assembly portion which includes the electromagnet for operating the latch to open position.
Figure 9:
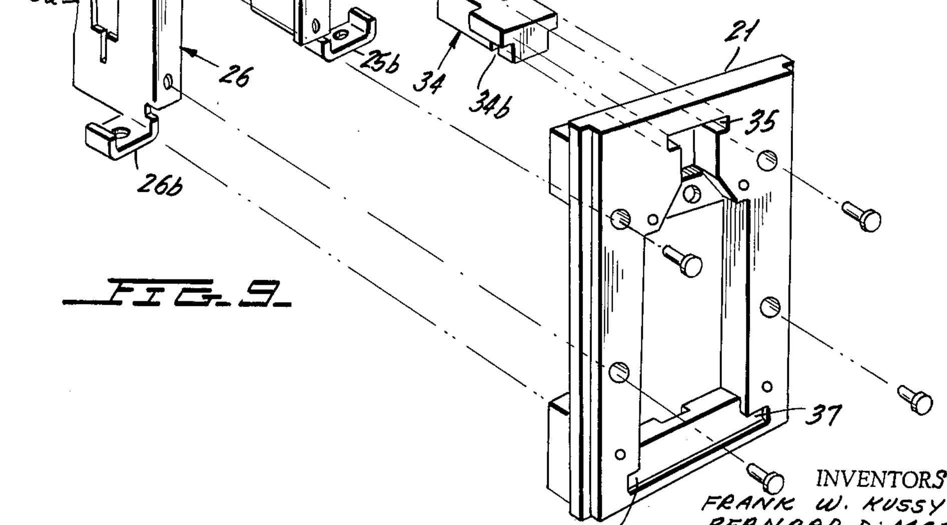
FIGURE 9 is an exploded perspective of the assembly which includes the switch arm operated by the latch unit electromagnet.

Now referring to the figures. Mechanical latch unit 20 is provided with a housing constructed of internal layer 21 sandwiched between external front and back layers 22, 23. Four screws 24 secure back housing layer 23 to internal layer 21 while ears **25*a* and 26*a* of terminal members 25 and 26, respectively, mount front housing layer 22 to internal layer 21**.

Terminal members 25 and 26 are riveted in fixed position to internal layer 21 with terminal portions **25*b* and 26*b* of members 25 and 26, respectively, projecting from the ends of the latch unit housing. Portion 25*c* of member 25, positioned internal of housing 21–23, carries switch contact 27. Portion 26*c* of terminal member 26, positioned internal of housing 21–23, is provided with V-notch 29 the base of which constitutes a pivot point for switch arm 30. Terminal member portion 26*c* is received in the notch 31 at one end of switch arm 30 while the other end of switch arm 30 carries contacts 27*a* and 28*a* on opposite sides thereof. As will hereafter become apparent movable contact 27*a* is operable into and out of engagement with stationary contact 27 while movable contact 28*a* is operable into and out of engagement with the stationary contact 28. Contact 28 is mounted to strap 32 carried by front housing layer 22**.

Switch arm 30 is operated by overcenter spring 33 which is a coiled member in compression. One end of spring 33 is positioned by projection **34*a* of insulating slide 34 while the other end of spring 33 is positioned within the longitudinal slot of switch arm 30 and engages lug 30*a* thereof. As will be hereinafter explained, slide 34 is operable from the position shown in FIGURE 3 in a direction away from rear housing layer 23 to a position wherein spring 33 is overcenter and thereby operates switch arm 30 so that contact 28*a* disengages contact 28 and contact 27*a* engages contact 27**.

Slide 34 is journalled for movement within aperture 35 of internal housing layer 21 and is prevented from cocking by bearing against guide lug 99 projecting forward from front housing layer 22 through the longitudinal slot of switch arm 30. Slot **34*b* in slide 34 receives upward extension 36*a* of mounting member 36**.

The lower portion of member 36 is provided with outward extensions **36*b* which are disposed within recesses 37 formed through the cooperation of the internal and rear housing layers 21, 23 so as to form a pivotal mounting for member 36. Rounded portion 36*c* at the bottom of member 36 abuts rear housing layer 23 with portion 36*c* constituting the pivot point for member 36. Member 36 is also provided with a lanced ear 40 which constitutes a mechanical latch extending rearwardly through aperture 41 in rear housing layer 23. Compression spring 39, interposed between member 36 and internal housing layer 21, biases latch 40 outward of housing 21–23** toward its latching position.

Rivets 41 fixedly secure armature 42 to pivoted member 36. As best seen in FIGURE 6, armature 42 is of U-shaped cross-section and as seen in the other figures, the armature faces are extremely elongated with the long dimension extending transverse to the pivotal axis of member 36. Armature 42 is positioned so as to be attracted by the electromagnet consisting of yoke 43 and windings 44, 45. Yoke 43 is a U-shaped member of substantially the same size as armature 42 with windings 44 and 45 encompassing different arms of yoke 43 and also encompassing the gaps between armature 42 and magnet 43. Rivets 47 fixedly secure yoke 43 to front housing layer 22. Yoke 43 and windings 44, 45 are carried by outer housing layer 22 with windings 44, 45 being connected in electrical series from conducting strap 32 to terminal member 46 which extends through front housing layer 22 forward thereof.

It is noted that both armature 42 and yoke 43 are of single piece construction rather than being of laminated construction. It is also noted that the V-shaped air gaps which exist between armature 42 and yoke 43 when windings 44 and 45 are deenergized are not completely closed when windings 44, 45 are energized because member 36 abuts an appropriately positioned formation of internal housing layer 21. Because of this it is not necessary to build in a fixed air gap or provide a shading mechanism for D.C. operation.

As seen in FIGURE 1, mechanical latch unit 20 of this invention is operated in conjunction with contactor 100 of a type fully described in the Cataldo et al. application Serial No. 189,915, filed April 24, 1962, entitled Electrical Device, and assigned to the assignee of the instant invention. In the aforesaid application there is shown a holding interlock unit 300 mounted to spaced terminals 105, 106 (FIGURE 2) at the line end of contactor 100.

As seen in the electrical schematic of FIGURE 10, mechanical latch unit 20 is electrically connected in circuit as follows. With latch 40 in the open or unlatched position to the left of the position it occupies in FIGURE 5 there is a series circuit between line L–1 and line L–2 which extends from terminal **26*b* through switch arm 30, switch contact 27, terminal 25*b*, operating coil 210 of contactor 100 and normally open start control 111. Under these conditions, if start control 111 is closed, contactor coil 210 will be energized so that the contact carrier 107 (FIGURE 5) of contactor 100 will move downward to a position below latch 40 thereby enabling spring 39 to move latch 40 to its latching position illustrated in FIGURE 5 wherein latch 40 is positioned to block upward movement of contact carrier 107**.

Spring 39 in moving armature 42 and member 36 in a clockwise direction, or to the right with respect to FIGURE 5, also moves slide 34 to the right. This positions spring 33 to operate switch arm 30 in a counterclockwise direction about its pivot, as viewed in FIGURE 3, thereby bringing contact **38*a* into engagement with contact 28**.

Now the circuit between lines L–1 and L–2 is as follows. From terminal **26*b* through switch arm 30 contact 28, mechanical latch coils 44, 45 and terminal 46 to normally open stop control 108. Under these conditions the closing of stop control 108 is effective to cause energization of mechanical coils 44, 45, thhereby generating a magnetic flux of sufficient magnitude so that armature 42 is attracted to yoke 43. This moves latch 40 to the left of contact carrier 107 when viewed in FIGURE 5 thereby permitting the return springs (not shown) of contactor 100 to open contactor 100**.

As seen in FIGURE 1, even though mechanical latch unit 20 is considerably taller than holding interlock 300, mechanical latch 20 is still short enough to fit within enclosure cover 110.

FIGURES 11 and 12 illustrate a toggle connection to be utilized so that the same type relatively small mechanical latch unit 20 as previously described may be utilized in connection with large size contactors. The contactor of the aforesaid copending patent application Serial No. 189,915 is provided with a stationary insulating member 300 which carries stationary contacts (not shown) and movable insulating member 301 which carries movable contacts (not shown). With member 301 moved downward away from member 300 to the position shown in FIGURE 11 the movable contacts are brought into engagement with the stationary contacts. Springs, similar to springs 199 of FIGURE 1, urge the contacts out of engagement by biasing member 301 upward toward member 300.

In the device illustrated in FIGURES 11 and 12 a toggle latching mechanism 305 is connected between members 300 and 301 to maintain the contactor contacts in engagement after they have been operated into engagement. Mechanism 305 includes upper toggle link 306 and bifurcated lower toggle link 307. The upper end of link 306 is joined by pin 308 to bracket 309 riveted to the underside of member 300. The lower end of link 306 is joined by toggle knee pin 310 to the upper end of link 307. The lower end of link 307 is connected by pin 311 to upward extension 312 of member 301.

Toggle links 306, 307 are maintained in the extended position of FIGURE 11 through the engagement of latching extension 313 with latching pin 314. Extension 313 is formed integrally with link 306 and is located adjacent to toggle knee 310. Latching pin 314 is one leg of U-shaped rod 315, both arms of which extend between the bifurcated sections of link 307. In a manner well-known to the art, pin 314 is provided with a cutaway section 317 and is biased in a counterclockwise direction with respect to FIGURE 11 by coil spring 331. Clockwise rotation of pin 314 brings the cutaway portion 317 into position opposite latching extension 313 of link 306 thereby permitting toggle 306, 307 to collapse through movement of knee 310 to the left with respect to FIGURE 11. L- shaped member 320 is fixedly secured at one of its ends to latch pin 314 while the other end of member 320 is engageable by the free end of member 321. Member 321 is part of unit 325.

Unit 325 is essentially the same in size and construction as mechanical latch unit 20, the only significant differences being that the end of member 321 remote from member 320 is fixedly secured to mounting member 36 in the region of the pivot for member 36 and housing portion 23 is provided with an aperture through which member 321 extends.

With the armature for the electromagnet biased to its normal position, member 321 is in the position shown in FIGURE 11 so that when member 301 is moved downward relative to member 300 to the position shown in FIGURE 11 toggle 306, 307 will be latched. This latching condition will prevail until such time as latch 314 is rotated clockwise from its position of FIGURE 11.

This is accomplished by energizing the electromagnet of unit 325. By so doing the upper end of mounting member 36 moves to the left with respect to FIGURE 11 and the free end of member 321 moves upward into engagement with member 320 to operate member 320 in a direction which rotates latch pin 314 clockwise with respect to FIGURE 11. Now there is nothing to block movement of link extension 313 so that toggle 306, 307 is free to collapse under the influence of the biasing springs which urge member 301 toward member 360.

The toggle latching arrangement of FIGURES 11 and 12 is provided for larger size contactors because of the larger contact pressure springs and larger biasing springs for operating the contactor contacts out of engagement. If the mechanical advantage introduced by the toggle latch were not provided a mechanical latch unit of small size would not be effective.

Thus, this invention provides a novel construction for a mechanical latch unit which is operated in conjunction with a multi-phase contactor. The latch unit construction is inexpensive and compact since the cooperation between the latch unit and contactor is such that the latch unit is energized only momentarily. Further, the latch unit is so constructed that it may be readily installed in the field and may readily replace an existing electrical interlock arrangement.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A mechanical latch unit for a contactor, said unit comprising a housing, an electromagnet having a movable armature, an element including a latching part extending through a wall of said housing external thereof for maintaining contactor contacts in engagement, means connecting said armature and said latching part for automatically operating the latching part to a latching position when said armature is moved to a first position and automatically operating said latching part to a releasing position when said armature is moved to a second position, a switch means within said housing connected to said armature for operation thereby as said armature moves between said first and said second positions, said switch means having a first section which is open when said armature is in said first position and closed when said armature is in said second position, said switch means having a second section which is closed when said armature is in said first position and open when said armature is in said second position, said electromagnet including an operating coil, and means within said housing connecting said coil in circuit with one of said switch means sections such that energizing current for said coil passes through said switch means.

2. The unit of claim 1 in which the second section of said switch means constitutes said one of said switch means sections.

3. The unit of claim 1 in which there is a biasing means urging said armature to said first position and in which energization of said coil is effective to operate said armature to said second position.

4. The unit of claim 1 in which at least a portion of said latching part is retracted within said housing when said coil is energized.

5. The unit of claim 4 in which the switch means comprises an arm, said first section including a first contact, said second section including a second contact, and means mounting said arm for operation from one to the other of said contacts.

6. A mechanical latch unit for a contactor, said unit comprising a housing, an electromagnet having a movable armature, an element including a latching part extending through a wall of said housing external thereof for maintaining contactor contacts in engagement, means connecting said armature and said latching part for automatically operating the latching part to a latching position when said armature is moved to a first position and automatically operating said latching part to a releasing position when said armature is moved to a second position, a switch means within said housing connected to said armature for operation thereby as said armature moves between said first and said second positions, said switch means having a first section which is open when said armature is in said first position and closed when said armature is in said second position, said switch means having a second section which is closed when said armature is in said first position and open when said armature is in said second position, said switch means comprising an arm, said first section including a first contact, said second section including a second contact, an over-center spring operated mechanism for operating said arm from one to the other of said contacts, said electromagnet including an operating coil, and means within said housing connecting said coil in circuit with one of said switch means sections such that energizing current for said coil passes through said switch means, a portion of said latching part being retracted within said housing when said coil is energized.

7. The unit of claim 6 in which there is a first, a second and a third terminal carried by said housing and extending external thereof, said first contact mounted to a portion of said second terminal positioned internal of said housing, said arm mounted to a portion of said third terminal positioned internal of said housing, said coil connected between said second contact and said first terminal.

8. The unit of claim 7 in which one of said terminals projects from a wall of said housing opposite the wall through which said latching part extends and the others of said terminals project from opposite ends of said housing.

9. The unit of claim 8 in which the housing comprises an inner layer sandwiched between first and second outer layers, said electromagnet and said one of said terminals mounted to said first outer layer, said others of said terminals are mounted to said inner layer.

10. The unit of claim 9 in which the second contact is also mounted to said first outer layer and said first terminal constitutes said one of said terminals.

11. The unit of claim 10 in which the second outer layer comprises the wall through which the latching part extends and the inner layer is provided with an aperture within which said armature moves.

12. In combination with a contactor having a stationary member with stationary contacts mounted thereon and a movable member with movable contacts mounted thereon and operable into and out of engagement with the stationary contacts through movement of said movable member relative to said stationary member; a mechanism including latching means for maintaining said movable contacts in engagement with said stationary contacts against the force of biasing means acting to separate said contacts; a unit for releasing said latching means; said unit comprising a housing, an electromagnet having a movable armature, an element extending through a wall of said housing to a position external thereof, means connecting said armature and said element for positioning said element to permit latching of said latching means when said armature is in a first position and operating said element to release said latching means when said armature is in a second position, a switch means within said housing connected to said armature for operation thereby as said armature moves between said first and said second positions, said switch means having a first section which is open when said armature is in said second position, said switch means having a second section which is closed when said armature is in said first position and open when said armature is in said second position, said electromagnet including an operating coil, and means within said housing connecting said coil in circuit with one of said switch means sections in a manner such that energizing current for said coil passes through said switch means.

13. In combination with a contactor having a stationary member with stationary contacts mounted thereon and a movable member with movable contacts mounted thereon and operable into and out of engagement with the stationary contacts through movement of said movable member relative to said stationary member; a mechanism including latching means for maintaining said movable contacts in engagement with said stationary contacts against the force of biasing means acting to separate said contacts; said mechanism including a toggle connected between the stationary and the movable members and positioned so that said toggle is extended when the movable contacts are in engagement with the stationary contacts, said latching means being provided with biasing means urging said latching means to latching position to maintain said toggle extended; a unit for releasing said latching means; said unit comprising a housing, an electromagnet having a movable armature, an element extending through a wall of said housing to a position external thereof, means connecting said armature and said element for positioning said element to permit latching of said latching means when said armature is in a first position and operating said element to release said latching means when said armature is in a second position, a switch means within said housing connected to said armature for operation thereby as said armature moves between said first and said second positions, said switch means having a first section which is open when said armature is in said second position, said switch means having a second section which is closed when said armature is in said first position and open when said armature is in said second position, said electromagnet including an operating coil, and means within said housing connecting said coil in circuit with one of said switch means sections in a manner such that energizing current for said coil passes through said switch means.

References Cited by the Examiner

UNITED STATES PATENTS

| | | | |
|---|---|---|---|
| 2,426,301 | 8/1947 | Ellis et al. | 200—87 |
| 2,525,846 | 10/1950 | Wilson | 200—106 X |

BERNARD A. GILHEANY, *Primary Examiner.*

ROBERT K. SCHAEFER, *Examiner.*